(No Model.)
J. H. GLAUBER.
FLEXIBLE JOINT OR COUPLING.
No. 567,231. Patented Sept. 8, 1896.
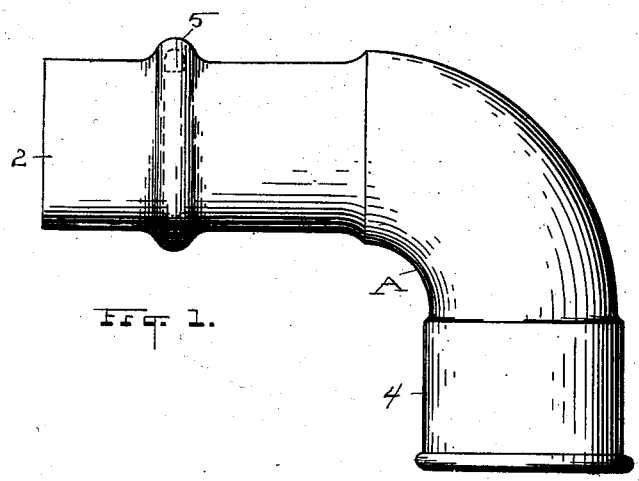
Fig. 1.
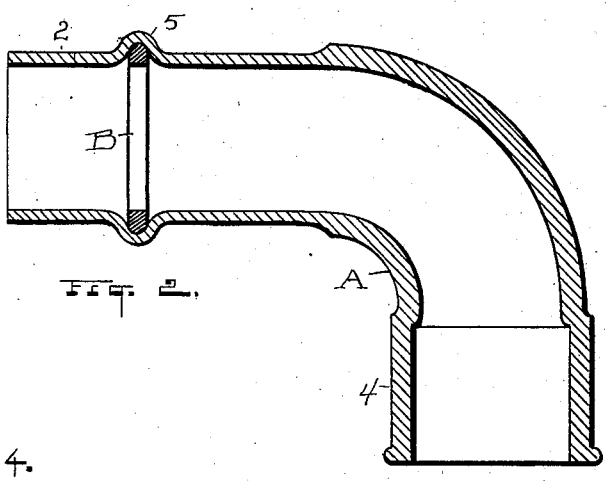
Fig. 2.
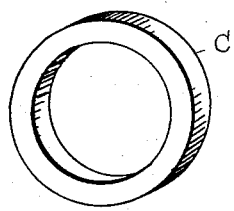
Fig. 4.
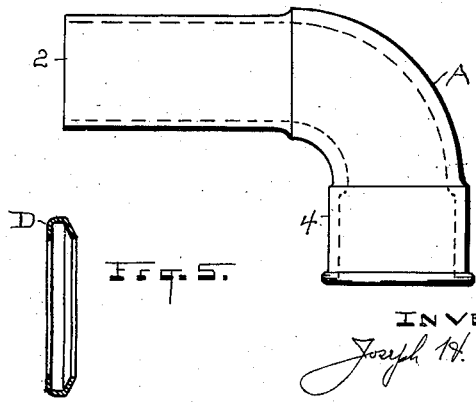
Fig. 3.
Fig. 5.
ATTEST
&c. B. Moser
H. E. Meidner
INVENTOR
Joseph H. Glauber
By H. T. Fisher ATTY

UNITED STATES PATENT OFFICE.

JOSEPH H. GLAUBER, OF CLEVELAND, OHIO.

FLEXIBLE JOINT OR COUPLING.

SPECIFICATION forming part of Letters Patent No. 567,231, dated September 8, 1896.

Application filed January 14, 1896. Serial No. 575,517. (No model.)

*To all whom it may concern:*

Be it known that I, JOSEPH H. GLAUBER, a citizen of the United States, residing at Cleveland, in the county of Cuyahoga and State of Ohio, have invented certain new and useful Improvements in Flexible Joints or Couplings; and I do hereby declare that the following is a full, clear, and exact description of the invention, which will enable others skilled in the art to which it appertains to make and use the same.

My invention has reference to improvements in flexible joints or couplings; and the invention consists in a coupling of rubber adapted to make connection between fixed pipes and water-closet basins and other vessels, and in which places a connection of greater or less length is required.

To this end my invention consists in a rubber connection of a flexible character and a distending ring in said connection of greater outside diameter than the inside diameter of said connection in its normal condition, whereby when said ring is inserted an annular rib is developed and the connection is in condition to be coupled with the basin, bowl, or other part, substantially as shown and described, and particularly pointed out in the claim.

In the accompanying drawings, Figure 1 is a side elevation of a connection embodying and disclosing my invention, and Fig. 2 is a central sectional elevation thereof. Fig. 3 is an elevation of a coupling as it appears before a ring is inserted. Figs. 4 and 5 are views of modifications in the form of rings that may be used in lieu of the form shown in Figs. 1 and 2.

It is now a well-known fact among plumbers that the places in which rubber connections or elbows of the kind shown are commonly used vary in distance, and that no two are apt to be exactly alike. In one case the space between bowl or basin and the water-pipe may tax the full length of the elbow or connection as furnished, and in another the connection may be longer than needed. Each particular place has its own conditions, and the elbow or coupling has to be adapted to them. If the coupling is too long, it has been customary to cut it off; and it will be noticed that the elbow A has a thin or reduced end portion 2, which is considerably lighter than the upright and curved portion 4, and it is this portion which sustains the shortening.
This elbow or coupling, furthermore, is made of rubber of such quality that it can be stretched, and hence the thin portion 2 can be expanded as much as needed to utilize it in my invention. Now, to render available a coupling of this kind, it has been customary to make the end portion 2 of such length as would meet extreme spaces or distances, and then as shorter couplings were wanted the said end was cut off according to the needs of the place and the kind of coupling. In some such couplings the construction was such that the cutting could only be at certain predetermined places, marked thereon by rings or flanges, or possibly by beads, at intervals; but my invention differs from the prior art in that I use a plain tube or elbow A, as seen in Fig. 3, and never cut off any part thereof, except, possibly, in an occasional extreme case, when the space for the coupling is unusually narrow; but if the end portion 2 is not so long as to project into the basin I do not cut it off. Indeed, I prefer that the coupling on said end should be removed from the extremity, say about as shown, so that there shall be no danger of leakage at the joint, and the projection will extend well beyond the joint to the basin. Now, in order to effect a joint connection I develop an annular rib in the portion 2 by means of a ring B, which is of such greater diameter than the inside of the tube that when the ring is inserted, as seen in Figs. 1 and 2, the tube will be distended and have an annular rib or bead 5 developed on its outside, on which the members of the coupling can be engaged, and thus I effect a joint that cannot possibly leak and at the same time secure this end of the connection A in place. The part A and the ring therefor go together as an article of manufacture and sale, and are put on the market and sold together. The ring, obviously enough, is movable back or forth in the portion 2 to any place where coupling is to be made, and wherever it be placed there also will be the coupling-rib which it produces. The tube 2 is flexible enough to be spread, as shown.

Modifications of the ring are shown in Figs. 4 and 5, in which Fig. 4 shows a band-like ring C and Fig. 5 a narrower form D, beveled at one side.

Any equivalent to either of the rings B, C, or D may be used, the essential point and novelty in the case being in a flexible coupling and a ring which will expand the coupling in such way as to form an annular bead or rib in the thin elastic portion 2 of the coupling, so that connection can be made upon the coupling about the outside thereof and irrespective of the place thereon.

What I claim as new, and desire to secure by Letters Patent, is—

A flexible connection for water-closet basins having its lower coupling-neck uniform in cross-section and with smooth and flush inside and outside surfaces, in combination with a ring of greater outside diameter than the inside diameter of said neck and substantially flush with the inside and constructed to be moved back into the same at greater or less distance to develop a coupling-rib about the outside of the neck at any desired point in the neck away from the end thereof, substantially as described.

Witness my hand to the foregoing specification this 4th day of January, 1896.

JOSEPH H. GLAUBER.

Witnesses:
H. T. FISHER,
H. E. MUDRA.